Nov. 8, 1960     C. H. KNAPP     2,959,748
TIME MODULATOR
Filed July 29, 1958
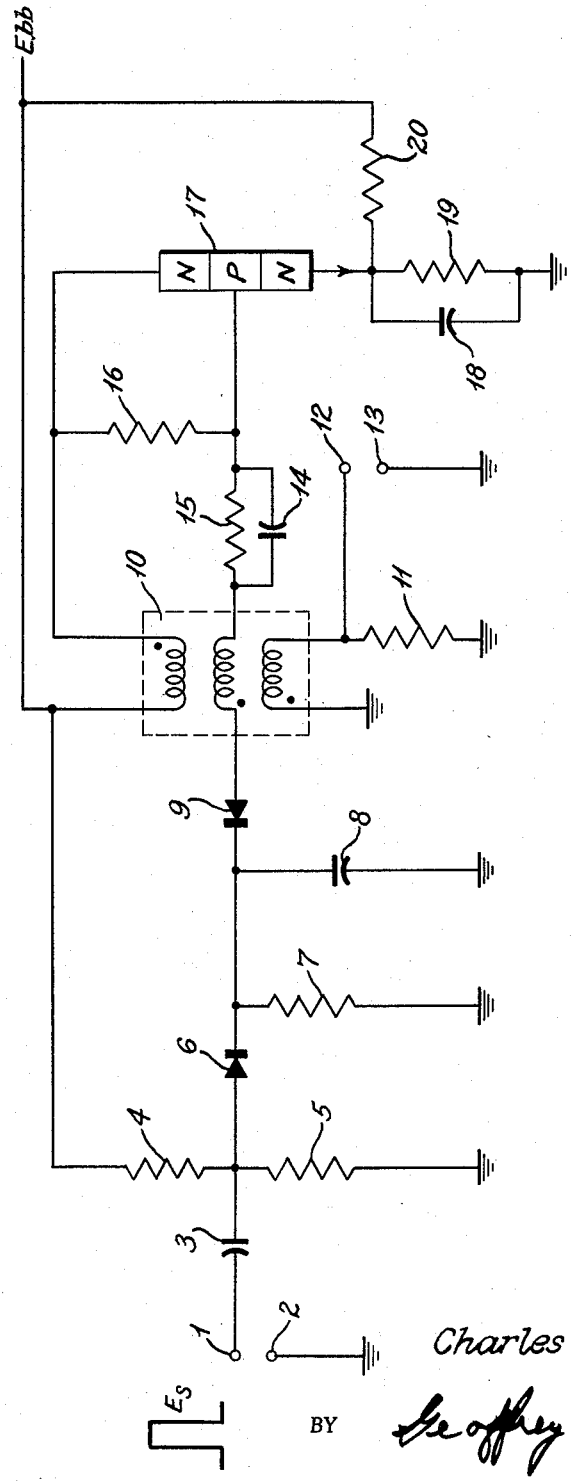
INVENTOR
*Charles H. Knapp*
BY
*Geoffrey Knight*
ATTORNEY

2,959,748

TIME MODULATOR

Charles H. Knapp, Mansfield Center, Conn., assignor to International Business Machines Corporation, New York, N.Y., a corporation of New York Filed July 29, 1958, Ser. No. 751,793

5 Claims. (Cl. 332—1)

This invention relates to a time modulator, and more particularly to a device for generating from a single input pulse, two pulses which are separated in time by a time interval proportional to the amplitude of the input pulse.

Many systems have been developed that require the conversion of information contained in the amplitude of a pulse to a form whereby the same information is contained in the time of occurrence of a pulse. As a first illustration, it is often necessary to convert analog information to digital form. This may be accomplished by sampling the analog information at a predetermined rate and converting the sampling pulse amplitude into two pulses, the first pulse occurring at the time of the sampling pulse and the second separated from the first by a time interval proportional to the amplitude of the sampling pulse. The two pulses so generated can then be used to open and close a gate to which "clock" pulses (pulses separated by a fixed time interval) are also applied. Thus, the number of "clock" pulses appearing at the output of the gate (digital information) is proportional to the amplitude of the sampling pulse (analog information).

As a second illustration, multi-channel wireless transmissions usually relay information by time modulation of pulses assigned to each channel. As an example, the intelligence on a particular channel, which may be speech, is sampled at a rate greater than the highest frequency in the intelligence to be transmitted. The resulting amplitude modulated pulses are converted to time modulated pulses in which the time occurrence of each pulse, with respect to a reference pulse, is proportional to the amplitude of the intelligence at the sampling time.

In practice, it has not been feasible to convert information contained in the amplitude of a pulse directly to a form whereby the same information is contained in the time of occurrence of a pulse wherein extreme accuracy is preserved, because of the difficulty of obtaining a time interval that is linearly related to the sampling pulse amplitude. Extreme accuracy is required where the analog to digital converter is one element of a servo system and in high quality multi-channel transmissions. Normally the sampling pulses of varying amplitude are first converted to pulses of varying widths and then finally to pulses varying in time of occurrence.

Additional prior art devices have attempted to obtain a linear time modulator by using the sampling pulse to charge a capacitor, and allowing the capacitor to discharge through a pentode; the end of the capacitor discharge initiating an output pulse. Devices of this type are limited in accuracy, however, because a pentode is not a true constant current device and because of variation in electron tube characteristics with time as well as variations from tube to tube.

The device of the present invention avoids the limitations of the prior art in an economical and efficient manner, by means of which information contained in the amplitude of a pulse is converted directly to a form whereby the same information is contained in the time of occurrence of a pulse wherein the time interval between said pulse and a reference pulse is linearly related to the sampling pulse amplitude. As hereinafter described, the sampling pulse is used to charge a capacitor, and novel means are employed to cause the capacitor to discharge in a linear manner without the use of electron tubes or other components which are subject to varying characteristics.

An object of this invention is to provide an improved linear time modulator.

Another object of this invention is to provide an improved means to generate, from a single input pulse, two pulses which are separated by a time interval proportional to the amplitude of the input pulse.

Yet another object of this invention is to provide a novel means to obtain a linear discharge of a capacitor.

Other objects of the invention will be pointed out in the following description and claims and illustrated in the accompanying drawing, which disclose, by way of example, the principle of the invention and the best mode which has been contemplated of applying that principle.

In the drawing:

The single figure is a schematic diagram of a circuit using this invention.

Referring now to the figure, there is shown the circuit to cause a linear discharge of a capacitor and a regenerative amplifier to develop two output pulses separated by a time interval proportional to the amplitude of an input pulse. The operation of the circuit will best be understood through the following mathematical analysis and discussion:

In the circuit as shown in the figure resistor 7 is chosen to be a much larger value of resistance than resistor 5. For this reason the voltage at the junction of resistor 4 and resistor 5, E ref, (assuming for the moment that diode 6 is ideal), is:

$$E \text{ ref} = Ebb \frac{\text{Resistor 5}}{\text{Resistor 4} + \text{Resistor 5}} \quad (1)$$

However, because of the presence of diode 6, this is also the quiescent voltage across capacitor 8. Upon application of a positive pulse of amplitude $E_s$ at terminals 1 and 2, through capacitor 3 and diode 6, capacitor 8 charges to a value equal to E ref plus $E_s$. Diode 6 is therefore back biased and capacitor 8 begins to discharge through resistor 7 and continues to discharge until the voltage across it is equal to E ref, at which time diode 6 again conducts and prevents further discharge of capacitor 8. During this discharge interval the voltage across capacitor 8, E8, is given by the equation:

$$E8 = (E \text{ ref} + E_s) e^{-t/T} \quad (2)$$

where $T$ = resistor 7 × capacitor 8 (assuming diode 6 is still an ideal diode).

The time, $td$, required for E8 to return to E ref is consequently $$E8 = E \text{ ref} = (E \text{ ref} + E_s) e^{-td/T} \quad (3)$$

or $$td = T \ln \left(1 + \frac{E_s}{E \text{ ref}}\right) \quad (4)$$

Using the relationship that $$\ln(1+x) = x - \frac{x^2}{2} + \frac{x^3}{3} - \ldots \quad 1 \times 1 < 1 \quad (5)$$

and assuming $$x = \frac{E_s}{E \text{ ref}} \ll 1$$

$$td = \frac{TE_s}{E \text{ ref}} = KE_s \quad (6)$$

where $$K = \frac{T}{E \text{ ref}} = \text{a constant}$$

Equation 6 shows that the time during which the voltage across capacitor 8 differs from E ref is proportional to the amplitude of the input pulse. The assumption that an ideal diode was employed was made to simplify the above equations and merely changes the value of T. Therefore if pulses are made available when E8 leaves and returns to the reference potential E ref, then the time interval between the pulses is proportional to the amplitude, $E_s$, of the input pulse, since capacitor 8 is caused to discharge linearly.

The remaining circuit elements of the figure are used to develop the required output pulses across resistor 11. Diode 9 normally conducts and, because of the resulting voltage drop across resistor 15, transistor 17 is held in its cut off state since the emitter of transistor 17 is maintained at a voltage equal to the quiescent voltage across capacitor 8 due to the fact that resistor 20 is equal to resistor 4 and resistor 19 is equal to resistor 5. When the input pulse of amplitude $E_s$ is applied through capacitor 3 and diode 6, diode 9 is back biased, therefore ceasing to conduct, and transistor 17 conducts. Through the use of positive feedback from collector to base of the transistor 17, provided by transformer 10, transistor 17 is rapidly forced to saturation, producing a pulse across resistor 11 at the output terminals 12 and 13. When the voltage across capacitor 8 has fallen to E ref, this time being a linear function of the amplitude of the input pulse $E_s$, diode 9 again conducts and the process is reversed, transistor 17 is rapidly cut off, and a second pulse of opposite polarity is developed across resistor 11.

Although the operation of the circuit of the figure has been described using positive input pulses, a circuit operating in an identical manner for negative input pulses would only require that the polarity of the diodes 6 and 9 be reversed, that transistor 17 be a PNP transistor, and that a negative voltage source be used.

A summary of the requirements and functions of the individual circuit elements of the figure is as follows:

Resistors 4 and 5 serve as voltage dividers to provide a reference potential across capacitor 8 and resistors 20 and 19 provide a reference potential for the emitter of transistor 17. The only restrictions are:

Resistor 4=resistor 20; resistor 5=resistor 19 and

Resistor 5<<resistor 7

Resistor 7 in conjunction with capacitor 8 establishes a discharge time constant. Resistor 15 serves as a control of the voltage by which transistor 17 is cut off and resistor 16 serves with resistor 15 to maintain transistor 17 cut off when diode 9 conducts, and provides sufficient bias for transistor 17 to conduct when diode 9 is cut off. Resistor 11 is used to develop the output pulses and to properly load transformer 10 in order to prevent free-running or multiple output pulses.

Capacitor 3 is used to couple the pulse $E_s$ to the time modulator. Capacitor 8 stores the amplitude of the pulse $E_s$ in the form of a slow linear discharge through resistor 7 and the back resistances of diodes 6 and 9. Capacitor 14 bypasses resistor 15, thus preventing resistor 15 from reducing the output pulse amplitude, and capacitor 18 bypasses resistor 19 in the emitter circuit of transistor 17, thus reducing degeneration caused by resistor 19 and stabilizing, for small lengths of time, the reference voltage at the emitter of transistor 17 during conduction.

Diode 6 serves as a low resistance to the incoming pulse $E_s$, but presents a very high impedance to discharge capacitor 8. Diode 9 controls the base current of transistor 17. When diode 9 conducts, transistor 17 is cut off and when diode 9 is back biased, transistor 17 conducts. Diodes 6 and 9 are preferably germanium crystal diodes with a very high back impedance and a low forward dynamic impedance.

Transformer 10 provides positive feedback from the collector to the base of transistor 17 insuring a fast rise time of the two output pulses generated from the single input pulse $E_s$. In addition, a third winding (and sometimes a fourth) of transformer 10 provides coupling for the output pulses.

Although it is apparent to one skilled in the art, that devices other than a regenerative amplifier could be employed to develop the required output pulses, the circuit as hereinbefore described is a preferred embodiment of this invention, since the output pulses so produced are characterized by sharp rise times, and as is well known, sharp rise times permit more precise measurement of time.

By way of example, a particular illustration of the invention may be characterized by the values shown in Table 1.

*Table 1*

| Component: | Value |
|---|---|
| Resistor 4 | 6.2k. |
| Resistor 5 | 24k. |
| Resistor 7 | 1.1 Meg. |
| Resistor 11 | 1.5k. |
| Resistor 15 | 1.8k. |
| Resistor 16 | 390k. |
| Resistor 19 | 24k. |
| Resistor 20 | 6.2k. |
| Capacitor 3 | 0.01μf. |
| Capacitor 8 | 560μμf. |
| Capacitor 14 | 0.01μf. |
| Capacitor 18 | 40μf. |

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A time modulator for converting amplitude modulated pulses to time modulated pulses comprising, a capacitor, means for establishing an original charge on said capacitor, said original charge being large in comparison to the maximum amplitude of said amplitude modulated pulses, means to add to said original charge a charge equal to the magnitude of each of said amplitude modulated pulses, resistive means to return said capacitor to said original charge condition, and means for developing output pulses at the time said capacitor leaves and returns to said original charge condition.

2. In a time modulator responsive to amplitude modulated pulses, a source of electrical potential, a capacitor, means to clamp said capacitor to a portion of said electrical potential, means to conduct each of said amplitude modulated pulses to said capacitor whereby said capacitor is charged to a sum potential equal to the sum of said portion of electrical potential and the magnitude of each of said amplitude modulated pulses, the magnitude of each of said amplitude modulated pulses being small compared to said portion of electrical energy, and resistive means to return said capacitor to said clamped potential whereby said capacitor is caused to discharge linearly.

3. The device of claim 2 including means to generate a pair of pulses for each of said amplitude modulated pulses, said pair of pulses separated by a time interval proportional to the amplitude of each of said amplitude modulated pulses, comprising a switching device attached to said capacitor, means to switch said switching device to a first conduction state when said capacitor reaches said sum potential, means to switch said switching device to a second conduction state when said capacitor returns to said clamped potential, and means operable each time said switching device changes conduction states to produce an output pulse.

4. A time modulator comprising, a single source of input signals only, said input signals consisting of amplitude modulated pulses, a capacitor, means for establishing a constant reference potential on said capacitor, means coupling said input signals to said capacitor to charge said capacitor to a sum potential equal to the sum of said reference potential and the magnitude of said input signal, resistive means to discharge said capacitor from said sum potential to said reference potential, and means for generating output pulses at the time said capacitor charges to said sum potential and discharges to said reference potential.

5. A time modulator comprising, a source of amplitude modulated input pulses, circuit means for generating from each input pulse a pair of output pulses separated by a time interval proportional to the amplitude of said input pulse, said circuit means including a capacitor, a resistor, means connecting said capacitor and resistor eletcrically in parallel, a source of electrical potential, unidirectional conduction means clamping said parallel connected capacitor and resistor to a portion of said potential, said portion being substantially greater than the amplitude of any of said input pulses, means coupling said input pulses to said parallel connected capacitor and resistor whereby said capacitor is charged to a sum potential equal to the sum of said portion of electrical potential and the magnitude of said amplitude modulated pulses, and means to generate an output pulse when said capacitor reaches said sum potential and when said capacitor returns to said clamped potential.

References Cited in the file of this patent

UNITED STATES PATENTS

| | | |
|---|---|---|
| 2,497,411 | Krumhansl | Feb. 14, 1950 |
| 2,870,412 | Hern | Jan. 20, 1959 |

FOREIGN PATENTS

| | | |
|---|---|---|
| 614,805 | Great Britain | Dec. 23, 1948 |